United States Patent [19]

Brennen et al.

[11] Patent Number: 4,719,402

[45] Date of Patent: Jan. 12, 1988

[54] VAR GENERATOR SYSTEM WITH MINIMAL STANDBY LOSSES

[75] Inventors: Michael B. Brennen, Pittsburgh; Mark G. Gernhardt, Herminie, both of Pa.

[73] Assignee: Westinghouse Electric Corp., Pittsburgh, Pa.

[21] Appl. No.: 943,215

[22] Filed: Dec. 18, 1986

[51] Int. Cl.⁴ ............................................. G05F 1/70
[52] U.S. Cl. ................................. 323/211; 323/206; 323/214; 323/218
[58] Field of Search ................ 323/206, 209, 210, 211, 323/214, 218

[56] References Cited

U.S. PATENT DOCUMENTS

| | | | |
|---|---|---|---|
| 3,989,999 | 11/1976 | Thompson et al. | 323/211 |
| 3,999,117 | 12/1976 | Gyugyi et al. | 323/211 |
| 4,234,843 | 11/1980 | Gyugyi et al. | 323/210 |
| 4,307,331 | 12/1981 | Gyugyi | 323/210 |
| 4,353,024 | 10/1982 | Gyugyi | 323/211 |
| 4,489,371 | 12/1984 | Kernick | 363/41 |
| 4,555,659 | 11/1985 | Gyugyi | 323/210 |

FOREIGN PATENT DOCUMENTS 2031667 4/1980 United Kingdom ................ 323/211

OTHER PUBLICATIONS

Gyugyi et al., "Characteristics of Static Thyristor-Controlled Shunt Compensators...", IEEE, vol. PAS-99, No. 5, 9/10 1980.

Gyugyi et al., "Principles and Applications of Static Thyristor Controlled Shunt Compensators", IEEE, vol. PAS-97, No. 5, 9/10 1978.

Primary Examiner—Patrick R. Salce
Assistant Examiner—Jeffrey Sterrett
Attorney, Agent, or Firm—C. M. Lorin

[57] ABSTRACT

In a hybrid switched-capacitor controlled-reactor static VAR compensator including a fixed-capacitor, hysteresis on switching-OFF a switchable capacitor of the capacitance bank is performed with a minimal fixed-hysteresis at the entrance of the standby region and with a temporary and variable-hysteresis in relation to any operating point in the standby region whenever maintaining the capacitor OFF is required. Since the fixed-hysteresis operates most often to prevent switching-OFF of the capacitor while the variable-hysteresis will operate less often, the losses at standby are minimized during thyristor-switched capacitor operation through most of this.

9 Claims, 17 Drawing Figures

FIG. 2
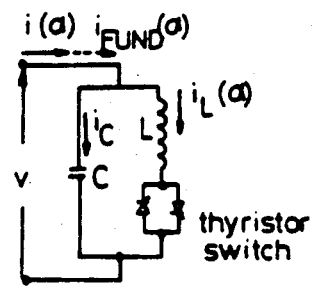
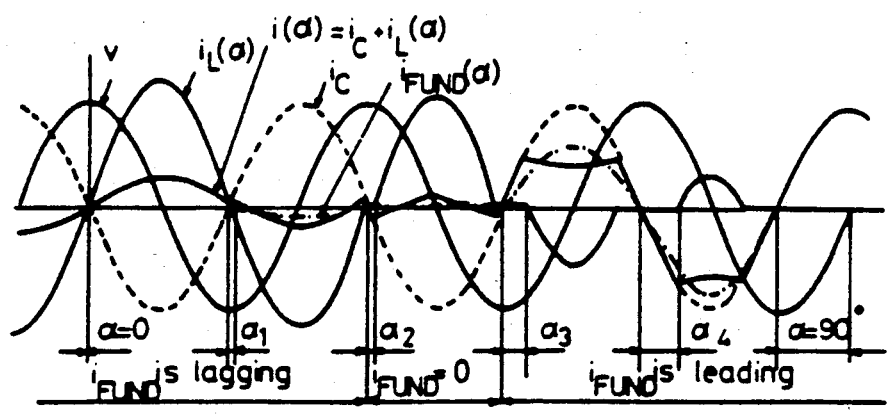
FIG. 3
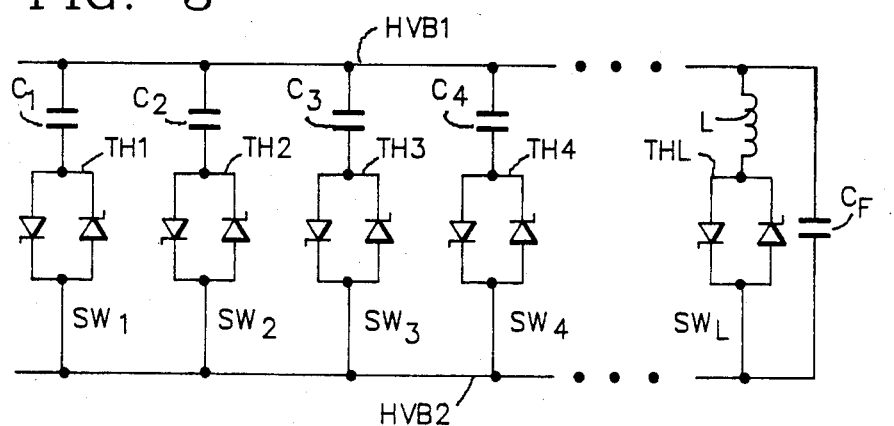

VAR GENERATOR SYSTEM WITH MINIMAL STANDBY LOSSES

The present invention relates to VAR generator systems in general, and more particularly to a fixed-capacitor combined thyristor-switched capacitor (TSC) thyristor-controlled reactor (TCR) reactive power compensating system for transmission lines having minimum standby losses.

As stated on pages 193 and 195 in "Reactive Power Control In Electric Systems" by T. J. E. Miller, a 1982 John Wiley publication, in a VAR compensation system with a fixed shunt capacitor, the losses increase with the conduction in the TCR (thyristor-controlled reactor) as a percentage of the capacitive reactive power rating, whereas in a hybrid type involving capacitor switching (TSC), the losses decrease with decreasing leading reactive power. Nevertheless, in the standby region, i.e. where a small symmetrical adjustment around zero megavar is taking place, the losses in the prior art are not negligible, since the apparatus remains at standby for extensive periods, the accumulated loss becoming quite substantial.

The object of the present invention is to provide a VAR compensation system in which losses at standby are minimized. In principle, for zero VAR concurrent capacitive and reactive currents are developed so as to match each other exactly. Nevertheless, switching capacitors and passing from capacitive to inductive, or conversely, are performed with hysteresis in order to smoothen control and avoid oscillations. However, the capacitors and/or inductors are still active during standby, causing losses. This problem has been considered in U.S. Pat. Nos. 4,307,331 and 4,353,024 of Laszlo Gyugyi. U.S. Pat. No. 4,307,331 shows an hybrid switched-capacitor controlled-reactor static VAR generator, whereas U.S. Pat. No. 4,353,024 shows a fixed capacitor combined with a hybrid system. In the U.S. Pat. No. 4,353,024 it is proposed to establish a deadband about the zero VAR operative point for which losses at standby are eliminated. However, in this case elimination of standby losses is obtained at the cost of also eliminating control and regulation in the deadband zone, thus, in the standby region.

SUMMARY OF THE INVENTION

In a hybrid switched-capacitor controlled-reactor static VAR generator including a fixed-capacitor, hysteresis between switching-in and switching-out any of the switchable capacitors of the capacitor bank is performed with a minimal fixed hysteresis at the entrance of the standby region and with a variable hysteresis in relation to any operating point in the standby region whenever maintaining the capacitor ON for that long is required. Since the fixed hysteresis operates most often alone to cause switching OFF of the capacitor, the losses at standby are minimized during TSC operation through the entire zone otherwise available for variable hysteresis operation. Nevertheless, the available variable hysteresis will operate in any critical situaton to hold the capacitor ON, thereby not losing the benefit of a large hysteresis effect, despite the narrow fixed hysteresis applied.

BRIEF DESCRIPTION OF THE DRAWINGS

FIG. 2 shows with curves the compensating current generated by a SVC for various firing angles in relation to the line voltage;

FIG. 3 illustrates a fixed capacitor in parallel to shunt reactor and capacitor banks of a hybrid static VAR generator of the prior art;

DESCRIPTION OF THE INVENTION

The invention will be described in the context of a fixed-capacitor switched-capacitor reactor-controlled VAR compensation system. For the purpose of describing a fully operative static VAR generator of the prior art, the following published references are hereby incorporated by reference:

"Characteristics of static thyristor-controlled shunt compensators for power transmission system applications" in IEEE Transactions vol. PAS-99, No 5, Sep./Oct. 1980, by Laszlo Gyugyi and Edgar Taylor.

"Principles and applications of static thyristor-controlled shunt compensators" in IEEE Transactions vol. PAS-97, Sep./Oct. 1978, by L. Gyugyi, R. A. Otto and T. H. Putman.

U.S. Pat. Nos. 3,989,999 (Thompson and Brennen); 3,999,117 (Gyugyi and Brennen); 4,307,331 (Gyugyi) and 4,353,024 (Gyugyi).

Figure 1:
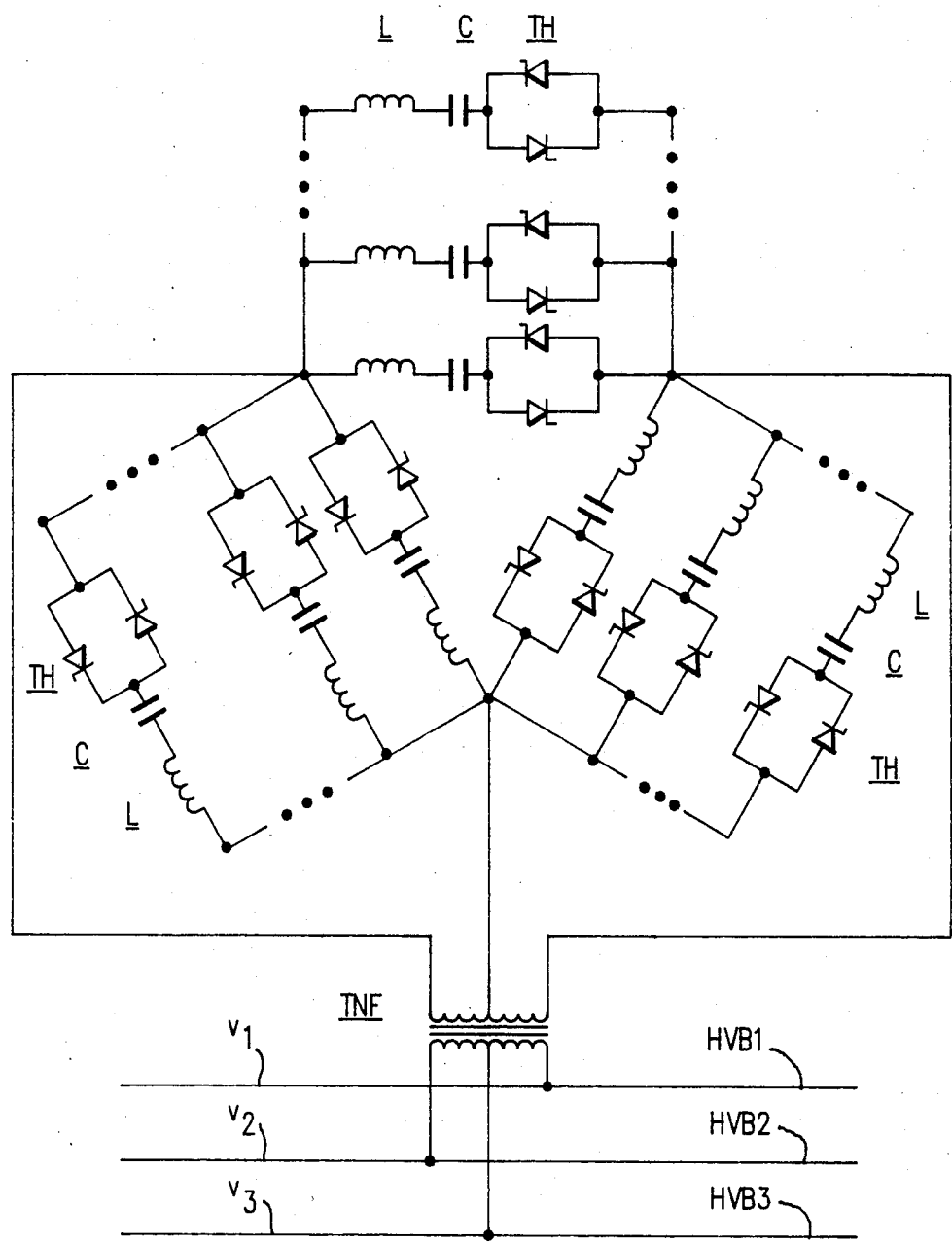
FIG. 1 shows capacitor and inductor banks of a static VAR generator (SVC) connected in delta among the three inputs of a transformer inputting into the three high voltage bus lines of a transmission line system.

FIG. 1 shows delta-connected capacitor C and reactor L units connected in parallel, each via antiparallel thyristors mounted as a unit, to the input of a transformer TNF outputting reactive and/or inductive currents into the high voltage bus lnes HVB1, HVB2, HVB3 of a three-phase transmission system operating under phase voltages v1, v2, v3.

FIG. 2 shows the line voltage vL as applied to a VAR generating unit comprising a capacitor C in parallel to a reactor L, the inductive current from the latter being controlled by varying the firing angle α of the thyrister unit TH between successively 0° (counted from the peak, or 90° electrical angle on the line voltage curve), α1, α2, α3, α4, and 90°.

FIG. 3 illustrates a bank of capacitors C1, C2, C3, C4 (selectively switched by respective thyristor units TH1, TH2, TH3 and TH4), an inductor in parallel thereto (controlled for switching by thyristors THL), and a fixed capacitor CF. Such a system is called a fixed-capacitor switched-capacitor thyristor-controlled reactor system. Hereinafter, control of the switched capacitors will be called TSC operation, whereas control of the thyristor-controlled reactor will be called TCR operation, thereby indicating modes of operation used to control the amounts of capacitive and inductive compensating currents admitted from the bank of capacitors and from the reactor to the transmission lines. The TCR mode is operable (with the shunt capacitors) to provide continuous regulation of the compensating inductive current, whereas switching of the capacitor under TSC operation is a discontinuous, or step process from capacitor to capacitor, while switching singly, or in combination, thyristor units TH1,...TH4. Because such a system combines, and also superposes inductive and capacitive compensating currents, it is also called a hybrid arrangement of a thyristor-controlled reactor system (TCR) and of switched shunt capacitors (TSC).

Figure 4:
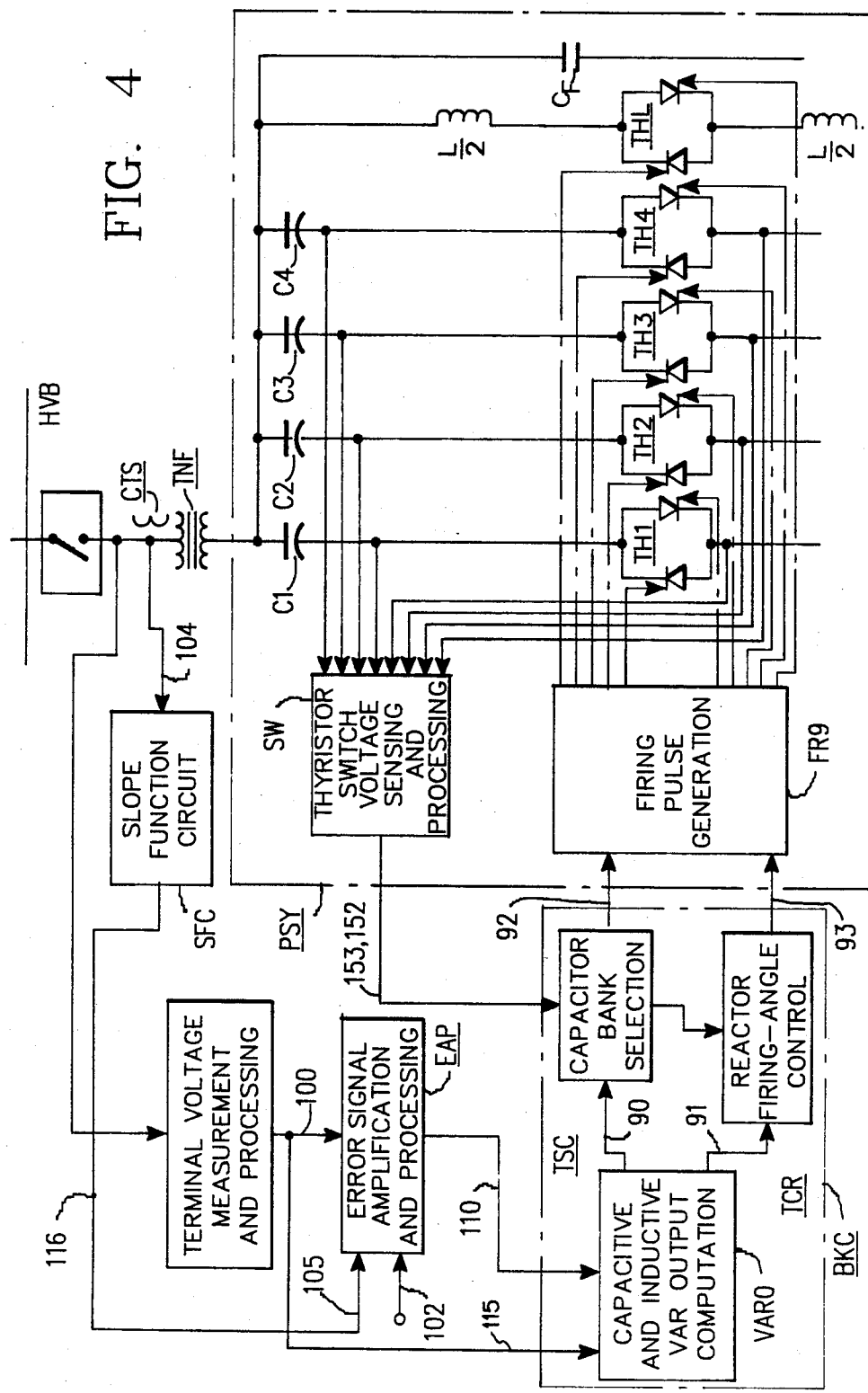
FIG. 4 shows the control system of a SVC of the type shown in FIG. 3.

Referring to FIG. 4, a VAR generator control system of the type of FIG. 3 is shown in block diagram. The current, sensed (by current sensor CTS) on the compensating input line to the high voltage bus line HVB, is fed back by line 104 to a slope function circuit SFC outputting on line 105 a feedback voltage for control, which is compared with a reference voltage $v_{REF}$ applied on line 102. The terminal voltage is derived via line 116 by a terminal voltage measurement and processing circuit providing, on line 100, a line voltage representative signal $V_L$. The signals of lines 100, 102 and 105 are inputted and combined within an error signal amplification and processing circuit EAP outputting on line 110 a signal which is representative of the current demand. In response thereto, a capacitive and inductive VAR output compensation circuit VARO (which is also responsive to the voltage signal of lines 100 and 115) determines the VAR demand in terms of the susceptance I/V and outputs on lines 90, 91 the command signals for the TSC and the TCR control, respectively. Within block VARO, look-up tables provide, as a function of the inputted susceptance demand I/V, the values of the firing angle for the corresponding thyristors (unit THL in case of reactor L during TCR operation), i.e. for each value of the ratio I/V corresponding to the signals of lines 110 and 115. Similarly, in block VARO are provided look-up tables determining the firing angle α and the capacitor switching combination in relation to the thyristor units TH1-TH4 and THL, depending upon the controlling ratio I/V on line 110. Corresponding control is enforced by lines 92 and 93, respectively for switching ON, or OFF, a corresponding capacitor (C1-C4) and/or adjusting the firing angle α of the thyristors involved.

As a result of such control, a change in the current I from the power system PSY will cause the signal v of line 105, through a closed-loop involving blocks EAP, VARO and the TSC and TCR blocks, to exert a corrective action upon the power system PSY. More generally, blocks VARO, TSC and TCR pertain to a bank control circuit BKC to which responds the power system PSY including block SW for thyristor switch voltage sensing and processing, and block FRG for firing pulse generation.

Figure 5:
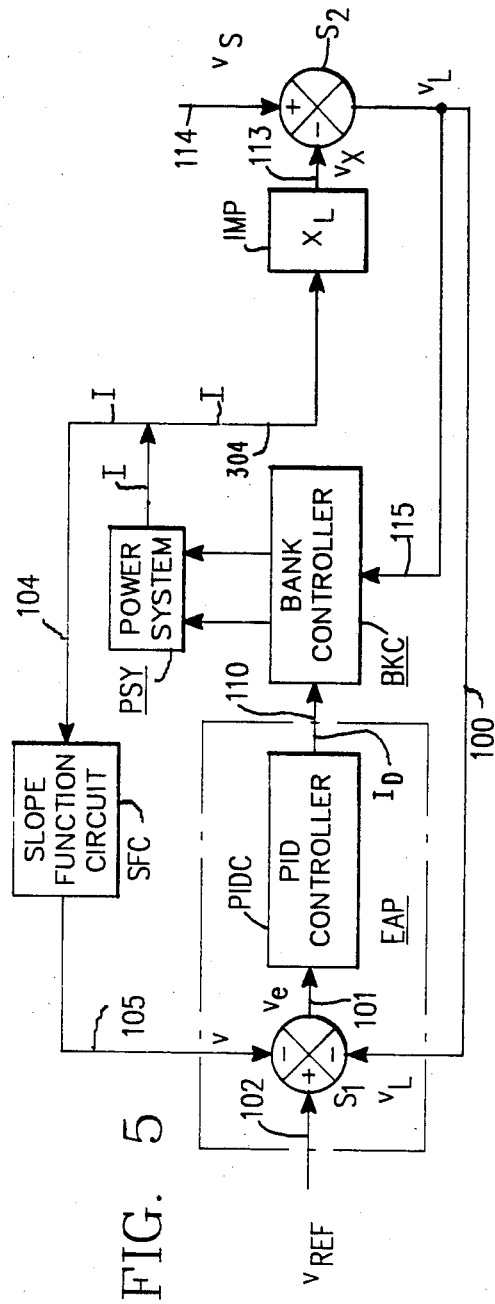
FIG. 5 is a block diagram illustrating more specifically the control loop within the system of FIG. 4.
Figure 6:
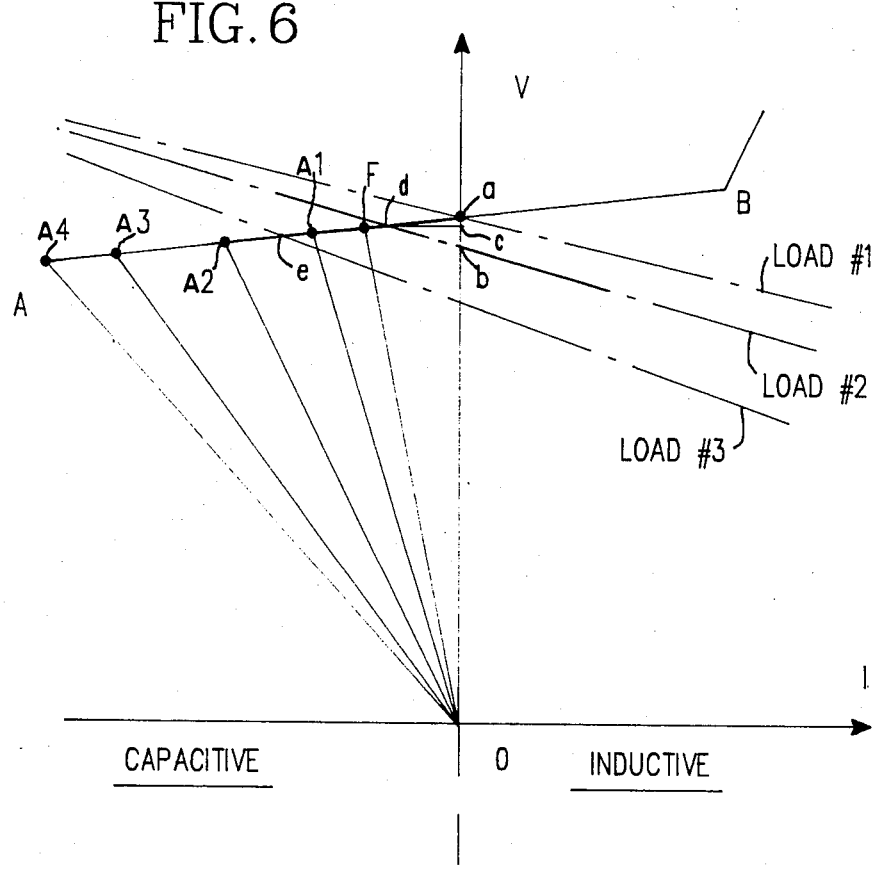
FIG. 6 is a set of curves illustrating the control line of the system of FIG. 5 and the load lines during operation of the SVC.

FIG. 5 is a block diagram illustrating the basic functions of the control system of FIG. 4. In FIG. 6 are given curves illustrating the operation of the control system of FIGS. 4, or 5.

In FIG. 5, block IMP represents the impedance $X_L$ which is under the compensating current I of lines 104, and 304. The output, on line 113, is a voltage representing $(I.X_L)$, or the voltage drop $v_X$ across such impedance. Summer S2 responds to the source voltage $v_S$, derived on line 114, and to the subtracted voltage $v_X$ of line 113, thereby outputting on line 100 the line voltage $v_L$. The current I developed on line 111 by the power system PSY is fed back by line 104 into a slope function circuit SFC outputting on line 105 a feedback voltage v. Summer S1 subtracts the signals of lines 100 and 105 from the reference signal $v_{REF}$ of line 102, thereby providing an error voltage $v_e$ on line 101. A PID controller responds to the error signal of line 101 to provide on line 110 a current demand representative signal which determines by processing and computation, within back controller BKC, what firing angle α and what capacitor selection will satisfy the VAR demand expressed by the signal of line 110. The power system PSY is accordingly controlled and an effective compensating current I will flow (by lines 111 and 104) to the high voltage bus line under the actual voltage $v_L$ of line 100.

The operation of the circuit of FIG. 5 will now be understood from a consideration of the curves of FIG. 6.

Considering the control line characteristic AB, the value at point a thereof on the ordinate represents the voltage $v_{REF}$ of line 102, namely when there is no error between line 100 and line 102. If $v_{REF}$ is the signal of line 102, v is the signal of line 105, $v_L$ is the signal of line 100 and on line 101 is the error $v_e$ developed at the output of summer S1, the closed-loop of FIG. 5 operates according to the following linear equation:

$$v_{REF} - v - I \times X_L = v_e.$$

When the line voltage $v_L$ varies unexpectedly, an error $v_e$ appears upon which the PID controller reacts by generating a current I which through the power system will tend to nullify the error of line 101. Assuming now that load # falls to the level of load #2 as shown, an error will appear defined by the discrepancy between point b and point a. The system will react by line 101, block PIDC and line 110, so as to bring the operating point back upon the control line AB, namely at its intersection with the new load line (load #2). The operating point, instead of being at a, is now at d. This is accepting an error relative to the ideal reference point a, as shown by point c on the ordinate, still less than it would have been at b. Considering control line AB in relation to slopes OA4, OA3, OA2, OA1 (and OF), which correspond to capacitors C4, C3, C2, C1 being switched (and capacitor $C_F$ always there), it is assumed first that the operation is without any of the capacitors C1, C2, C3, C4 being switched, thus only with capacitor $C_F$. The control line in this situation extends from F to B. At point a there was no inductive compensating current since the operating point is on the vertical of point O separating inductive from capacitive compensation. For the same reason, there is no capacitive compensating current. At point d for load #2, however, there is a capacitive current, as can be seen by a projection to the left upon the horizontal axis. Operating point d, as well as operating point a are reached by TCR control, namely by controlling the firing angle α of the thyristor unit THL for reactor L, thus making the operating point move from point F to the right on the control line. The action in the TCR mode is in conjunction with the effect of the reactive current due to the fixed-capacitor $C_F$. Similarly, if the load becomes as shown by characteristic load #3, the bank control circuit BKC in response to the lowered voltage marked on line 100, as illustrated by the lower intersecting point f on the ordinate, will call for switching capacitor C1. However, point A1 on the control line is still short of allowing operation at e on load line #3 as desired. Therefore, capacitor C2 will also be switched ON, by the bank control circuit BKC, thereby bringing the operating point as far as indicated by the slope of OA2. Control of the firing angle of switches THL will, then, bring the operating point back from A2 to e where there is intersection with the load characteristic (load #3).

FIG. 6 shows inclinations of the load lines and of the control line AB which are exaggerated for the purpose of clarity. It is observed, in the latter regard that the slope of AB is provided by the characteristic of the slope function circuit SFC.

If normal operation of the transmission lines is represented by load #1, thus, by operating point a, the system is generally at rest for such expected and desired situation. Control away from point a by firing of thyristors THL and of thyristors TH1, TH2, TH3, TH4, individually, or in combination, when switching ON, or OFF, some, or all, of capacitors C1,. . . C4, will occur only when needed and, in general, exceptionally. In normal operation, the VAR generator will thus be on standby. The object of the present invention is to minimize the losses at standby in the VAR generator. When the capacitors are turned OFF, thus during TCR operation, the standby losses are low. The object, therefore, is to minimize standby losses during TSC operation without any degradation of control performance in the standby condition.

Static VAR compensators (SVC's) are used on high power AC transmission lines, where they can provide voltage support to stabilize the power system after large system disturbances such as line faults, or power and phase oscillations developing in the lines due to load switching. The time of occurrence of such system disturbances is generally unpredictable. Therefore, an SVC system must be connected to the transmission lines permanently and remain at standby with its voltage regulation loop activated and "waiting" for the occurrence of any of the above events.

It may also be required that, in its standby condition, the SVC regulate the relatively small dips and daily variations of the transmission line voltage by using only a fraction of its inductive, or capacitive, output power capability. The standby voltage regulation range is usually limited to using only 20% of the rated capacitive, or inductive, output of the SVC.

Since the SVC has to be connected permanently to the transmission line, it is important for the user that the average losses in the high power equipment (which is of the order of several hundred mega-volt-ampere power rating) be kept as low as possible. The magnitude of the standby losses depends much upon the configuration of the power circuit of the SVC.

Figure 7:
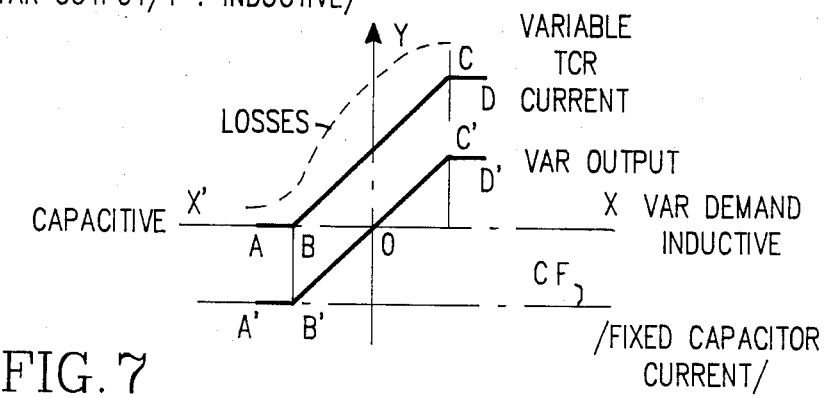
FIG. 7 shows the VAR output of a SVC of the fixed capacitor SVC and the losses involved including the standby region.

As shown in FIG. 2, the simplest SVC power circuit consists of a fixed-capacitor bank (C) and a thyristor-controlled (TH) reactor L. When the thyristors (TH) of the thyristor-controlled reactor (TCR) do not conduct (phased-out), such SVC power circuit produces its maximum capacitive output from the capacitor bank. As the TCR is gradually being phased in, the resulting inductive (fundamental) current simply cancels part of the capacitive current from the capacitor bank. The magnitude of the capacitive output at the SVC terminals is, therefore, decreasing. If the rating of the TCR, as shown in Figure 7, is for example twice that of the fixed capacitor (i.e. the capacitor bank), then, the capacitive output current can be reduced by controlling the thyristors TH, from A'B' (maximum capacitive current due to capacitor (C)) to a point where the VAR output becomes zero (at 0). From then on, an increasing inductive current output is observed (OC') as the firing angle α of the thyristor unit TH is increasing, and the magnitude of the outputted inductive output at the level C'D' becomes equal to the magnitude (BB') of the maximum capacitive rating of the SVC. The high standby losses due to this approach are illustrated by a dotted line in FIG. 7, where ABCD is the variable TCR-controlled inductive current from which the non-controlled capacitive current A'B'B'' is constantly subtracted.

One prior art technique to reduce the high standby power losses inherent in the fixed capacitor circuit is to employ thyristor-switched capacitors (TSC's) in conjunction with thyristor-controlled reactors (TCR's) within the power circuit of the SVC. In its simplest form, a TSC/TCR hybrid VAR generator uses identical inductive and capacitive output ratings, the TSC mode being switched ON when capacitive output is required, the magnitude of the capacitive output current being regulated by the cancelling effect of the TCR controlled inductive output current. If the TSC and the TCR banks have identical ratings, both banks will be OFF when at standby, i.e. at zero VAR for the SVC. This appears from FIG. 8, where A'B'C'D' is the VAR output under the effect of a TSC current along A'B'E', while there is a progressively increased cancelling effect by the TCR current along BE. At point 0 on the VAR demand axis, the capacitive TSC current goes to zero by switching the capacitor bank altogether OUT. At the same time, the firing angle α for the TCR thyristors (TH1–TH4) is delayed by as much as 90° (counted from the peak, or 90°, on the line voltage curve), thereby having the overall operating point at 0 on the B'C' curve. Thereafter, if necessary, the inductive current may be adjusted to provide, somewhere along the OC' trajectory, a net inductive compensating current injected into the bus lines from the SVC.

Figure 8:
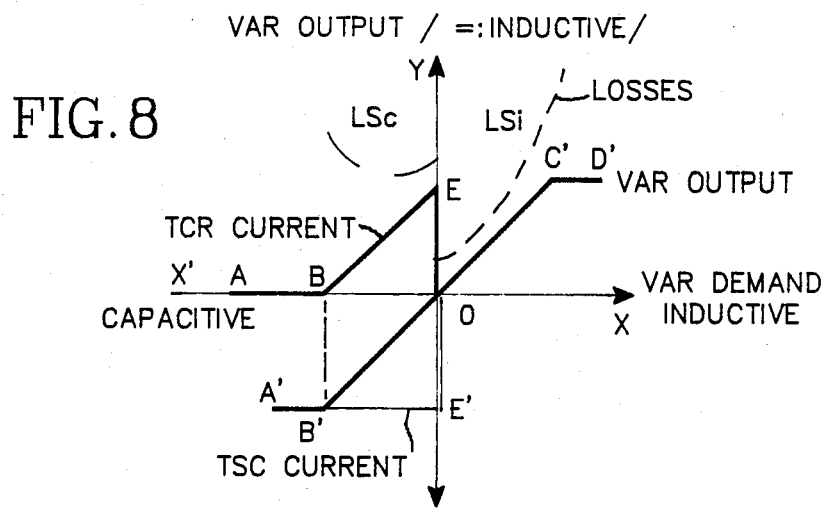
FIG. 8 shows the curves of FIG. 7 for a TSC/TCR type of SVC.

FIG. 8 shows the losses in dotted line: LSC for the capacitive output side (left of 0 on the axis), LSI for the inductive output side (right of 0). It appears that, due to the capacitor bank being ON until line EE' is reached, the losses are still relatively high when approaching the "switched OFF" line. In contrast, the losses under minimal inductive compensating current are low along the low magnitude level of OC'. Therefore, it is desirable to reduce the losses left of EE', if the system stays at standby. In fact, the system often enough will stay in that high loss neighboring zone. Because of this, the system will not be allowed voltage regulation in the capacitive region of the standby zone.

Figure 9:
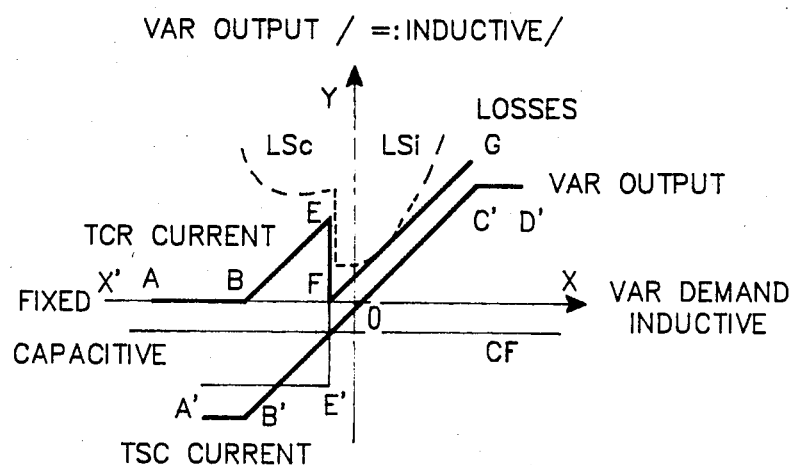
FIG. 9 gives curves like in FIG. 8 where the system further includes a fixed capacitor.

In order to overcome this problem, a solution of the prior art will now be explained in the context of the preceding assumption, made for FIG. 8, of identical inductive and capacitive output ratings in the switched-capacitor hybrid TCR type of a SVC power circuit. What is proposed is to combine the preceding arrangement with a fixed capacitor (like in FIG. 7). Illustratively, as shown in FIG. 9, the fixed capacitor $C_F$ is assumed to be rated at 20% of the overall capacitive output. Thus, the bank of capacitors of the TSC mode is rated at only 80%. On the other hand, the TCR mode is rated at 120%. This appears on FIG. 9 from line CF (fixed capacitor $C_F$) which is at a distance from the horizontal axis which is one fourth of the ordinate of point E' defining the TSC capacity. TCR operation follows ABEFG, where E indicates that the capacitor of the switchable bank has been switched OFF. This means that beyond point F, FE' no longer exists on the capcitive side. Accordingly, TCR operation is controlled for return to zero inductive current, like along AB earlier. It is observed, that with this arrangement the fixed capacitor $C_F$ has shifted the zero inductive current and zero capacitive current on line L1 to the left of the ordinate, when comparing with FIG. 8. This shift is in proportion to the rating of the fixed capacitor relative to the switched capacitor bank rating. Now, the capacitive loss curve LSC has its abrupt fall right on the EE' vertical (or L1 limit). Like in FIG. 8, but as soon as such line L1 (rather than along the ordinate in the case of FIG. 8) is reached, the losses are low for the start of the inductive loss curve LSI. FIG. 9 also shows the matching limit L2 for the other side of the standby region. The lowest loss in the standby region ($\pm \times 20\%$ of rated output) is at the highest fixed capacitive output power. The highest standby capacitive output occurs just before capacitor switching (EE') by the TSC system. At zero VAR output, in the middle of the standby region, the TCR system operates at low current that represents only a small additional standby loss. At 20% inductive output power, the losses are somewhat higher, but they are still only a fraction of the significant losses that occur when the TSC system is energized. The fixed capacitor, as a matter of fact, serves as an harmonic filter consisting of tuned harmonic filter branches serving to keep harmonic distortion caused by TCR operation below specified levels defined for the SVC.

Unfortunately, the low losses in the configuration just discussed for the ($\pm$) output power region are coupled with difficulties for standby voltage regulation. The problem is that when the SVC operates as a closed loop transmission line voltage regulator, the varying and generally unknown transmission line impedance becomes a gain term in the control loop. Typically, a control loop provides optimal response at a given gain. When the gain increases, the control tends to overshoot causing an oscillatory response. On the other hand, a lower than optimal gain tends to make the control loop react in a sluggish, overdamped manner.

Figure 10:
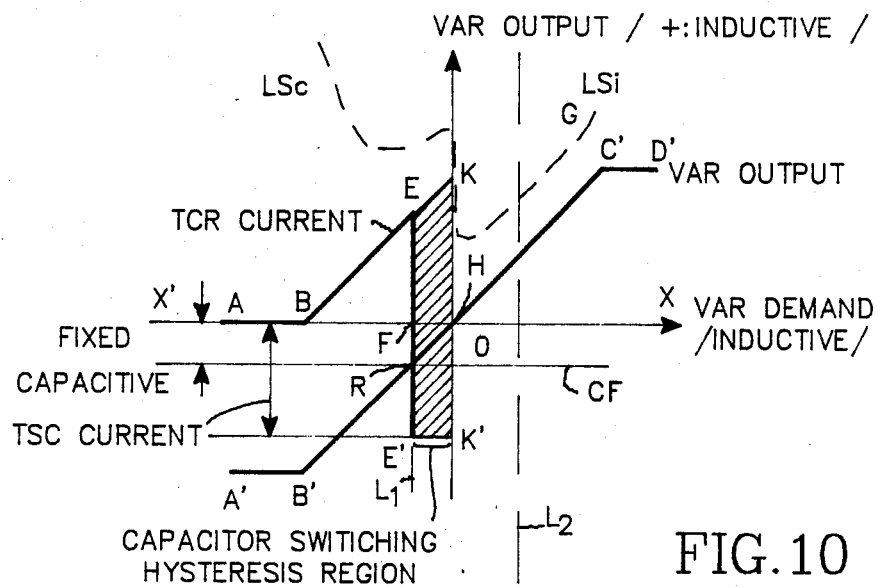
FIG. 10 illustrates with curves like in Figure 9 how the use of hysteresis in both directions of switching of a capacitor affects adversely the losses in the standby region.

This requires that the control gain be set in a compromised manner to allow a certain degree of oscillatory response, while still preventing instability even in the worst case, for the highest line impedance expected. On the other hand, this means that an SVC based voltage regulator can be very sensitive to disturbances when the varying transmission line impedance becomes high. One such disturbance, for example, is capacitor switching which can be accentuated by the corresponding delayed phase angle jump in the compensating TCR system. The operation of the TSC controls, therefore, results in a sustained oscillation of capacitor switching. This kind of oscillation, among other problems, causes the generation of an excessive amount of harmonics by the TSC system. These harmonics can generate telephone interference, overcurrents and overvoltages elsewhere in the equipment and in the transmission lines. It has been found that hysteresis must be employed with TSC switching when responding to a VAR demand in order to alleviate the oscillation of the TSC system. The magnitude of the switching hysteresis which is necessary can be as high as 20% of the rating of the TSC system. FIG. 10 shows by comparison with FIG. 9 the effect of switching hysteresis.

In order to implement the required amount of switching hysteresis, when the VAR demand moves from capacitive towards inductive demand, the capacitor switching-OFF (at EF on FIG. 10) is delayed until KK' where, in the example shown, the approximately zero VAR demand point is reached. Conversely, when the VAR demand slews from the inductive region into the capacitive region, the capacitor switching-ON (at OK in FIG. 10) is delayed until EE' where the TCR system has been phased back (at F in order to match the fixed capacitor effect) into non conduction. (Typically, F stands at 20% of the rated capacitive output.) It is observed, that a larger than 20% capacitive VAR demand in the course of standby regulation will leave the TSC system in conduction indefinitely, at least until an inductive VAR demand becomes required by the voltage regulation loop. This also means that the standby losses in the hysteresis region can be either high, or low, depending on the previous TSC switching history. This appears from the LSC curve in dotted line shown in FIG. 10 which, on account of the hysteresis between EF and OK, has been shifted to the right along the ordinate line. Therefore, the benefit of low losses in that region, such as shown in FIG. 9, has been lost.

The introduction of the switching hysteresis could therefore defeat the original purpose of the switched/-fixed capacitor combination of the power circuit which is to decrease the standby losses of the SVC during standby voltage regulation by using less than ($+,-$) 20% of the rated output power. One possibility to avoid this is to install a larger than 20% fixed-capacitor bank and to have a consequently smaller TSC system, thereby extending the low loss standby region into the capacitive VAR demand zone. However, this would require larger TCR currents (trajectory FG) in the standby region, thereby increasing the overall standby losses. Therefore, the latter approach is not considered practical for the implementation of low losses in the standby voltage regulation region.

According to the present invention, an approach to the problem is now proposed based on the concept that low losses in the standby voltage regulation mode can be maintained if the overall switching hysteresis is divided into two parts: one fixed hysteresis and a variable hysteresis, the fixed hysteresis being substantially smaller than the latter. The implementation of the proposed dual hysteresis within a switched-capacitor type of SVC system is illustrated by curves in FIG. 11. Normally, the fixed hysteresis is in effect. Its value is relatively small, as shown by the distance between L1 and L'1, typically about 10% of the variable hysteresis shown in FIG. 11, it being understood that, in operation, L'2 is variable from the full extent L'1, L'2 down to zero along line L'1.

Starting from zero VAR output (along OK), the TSC system will not operate to switch the capacitor ON until an increasing VAR demand essentially brings the operating point outside the standby region to the left. At this point, the voltage regulator has an overall, approximately 20%, hysteresis as defined by line L1 relative to line L'2. Once the TSC system is turned ON, the fixed hysteresis and the variable hysteresis become simultaneously activated. This amount of hysteresis is sufficient to avoid oscillation of capacitor switching induced by control overshoots in the activation of the switched capacitor bank, as earlier mentioned. The duration of such transients typically does not exceed six cycles. Therefore, shortly after the request for capacitor switching-OFF, assuming the fixed hysteresis has already been established by an operating point corresponding to a VAR demand situated to the right of vertical line L'1, the variable hysteresis does not have to be maintained longer than such six cycle period. After that, it will be either removed, or gradually phased back in time to a zero value i.e. to the vertical line L'1. Therefore, when the system experiences a decreasing VAR demand and crosses the border of the capacitive standby limit (vertical line L1), the TSC system will not switch-OFF because of the fixed hysteresis effect (until vertical L'1). Thereafter, the capacitive demand must decrease to a value situated to the right of vertical line L'1, before the TSC system switches OFF, the fixed-hysteresis having expired. At this instant, the operating point is to the right of line L'1, and the variable hysteresis has been timed or is in the process of being gradually phased out. It will, therefore, add its effect by preventing the TSC system from switching the capacitor OFF, despite the expiration of the fixed hysteresis. In other words, under such circumstance, the capacitor will be maintained ON in the standby region extending from vertical line L'1 onto somewhere before the zero VAR ordinate depending upon the timing, or position, of the variable hysteresis limit when it meets the operating point. In other words, the variable hysteresis is both variable and temporary. If the VAR demand, while going forward to the right, meets with the variable hysteresis while it lasts, switching OFF will be postponed until then. If however, the variable hysteresis has expired and the VAR demand is in the standby region, switching OFF will occur. As a matter of fact, the effect of the fixed hysteresis will keep the TSC switched OFF in the standby region for more than 99% of the voltage regulation time in that region. It appears, therefore, that the advantage of the hysteresis approach according to FIG. 10 has been kept but, nevertheless, the advantage of the falling losses illustrated on curve LSC along line EF with the fixed capacitor approach of FIG. 9 has been maintained. It is observed that the magnitude of the variable hysteresis is comparable to the rating of the fixed capacitor bank. Since with this approach the TSC system is active only for an insignificant length of time in the standby region of the VAR demand, nearly ideally, low losses can be maintained during standby voltage regulation without adversely affecting the full dynamic power control response of the SVC system.

It is observed also that, while the use of a variable hysteresis is minimizing the standby losses, i.e. in the standby region, dual hysteresis according to the present invention is also applied to the other switching stages of the TSC capacitor bank. Therefore, the fixed and variable hysteresis come into effect, as just described, whenever a capacitor is to be switched-OFF upon a decreasing VAR demand. It will work when the capacitor C1 (assumed to be the first in the bank) being ON would be required to become OFF and TCR operation would have to take over the compensation alone. It will work also whenever, capacitor C2 (the next one in rank in the bank) being ON, it is required that it be switched OFF. Then, capacitor C1 will take over. The same can be said for capacitor C3 or capacitor C4 (in the order of the bank). In this regard, as mentioned hereinafter, it is possible that an operating point determined by the VAR demand, be situated in a zone of TSC control adjusted with TCR operation in relation to the C1 capacitor, for instance, or that the same operating point belong to a switching-OFF command of capacitor C2 as it is being held back under its own fixed-hysteresis and/or variable hysteresis, as mentioned earlier.

Figure 12:
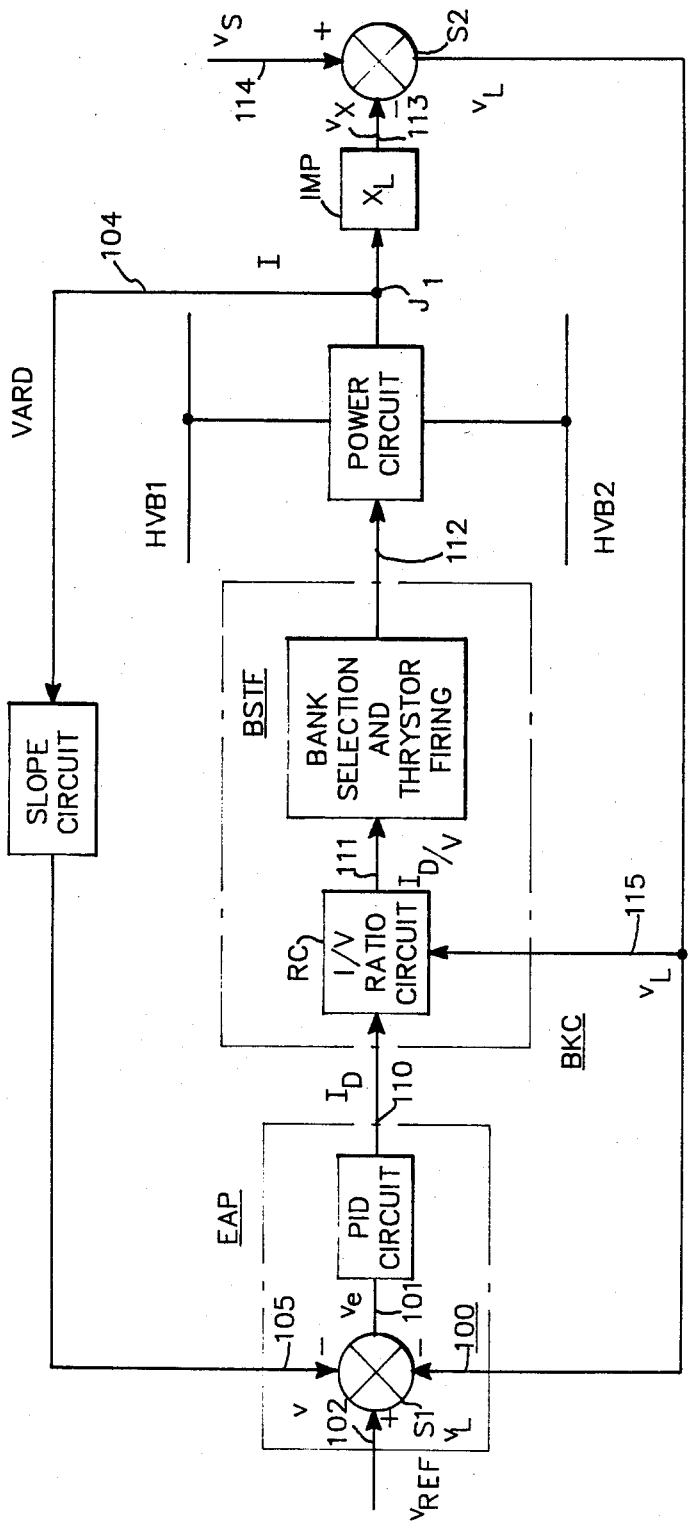
FIG. 12 is a block diagram illustrating more specifically the control loop of FIGS. 4 and 5.

Referring to FIG. 12, a block diagram is given showing how closed-loop control along line AB in Figure 6 is implemented. At a given moment, under the control loop responding to an error $v_e$ on line 101, the power circuit PSY outputs at junction J1 a current I which is fed back by line 104 into a slope function circuit SFC outputting on line 105, into summer S1, a feedback signal v which has the effect of minimizing the error $v_e$ of line 101. Output current I passes through the impedance $X_L$ of the system (block IMP), thereby creating a voltage drop $X_L \times I = v_x$. Summer S2 derives on line 100 the difference between the voltage $v_s$ of the power source and such voltage drop $v_x$, whereby the line voltage $v_L$ appears on line 100. The signal of line 100 is in turn compared by summer S1 with a voltage reference $v_{REF}$ applied to the system on line 102, while the feedback signal v of line 105 causes a compensating action translated by the error signal $v_e$ of line 101.

Figure 13:
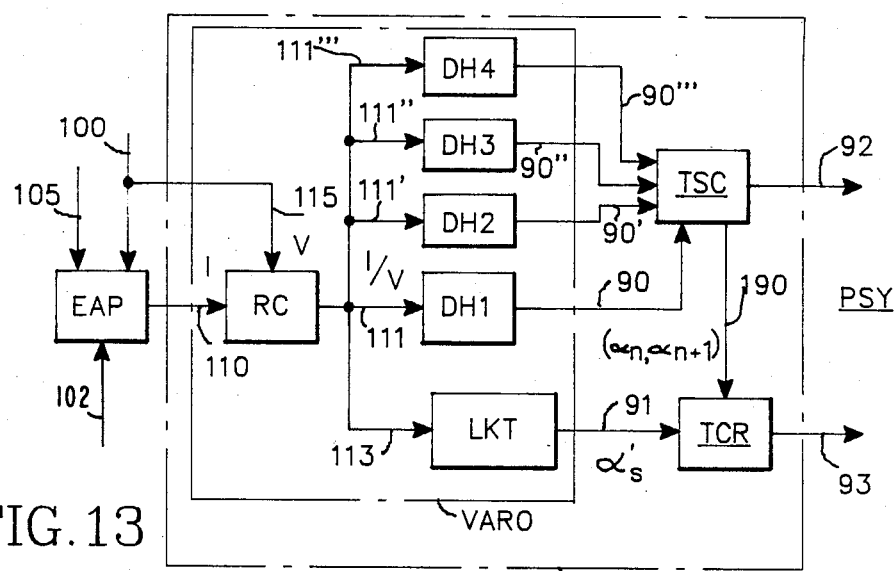
FIG. 13 shows how the dual hysteresis function according to the present invention can be inserted in the control system of FIG. 4.

A control circuit CNT, preferably in the form of a PID (proportional, integrator, differential) circuit, responds to the error signal $v_e$ by generating on line 110 a current demand Id for the system. The error signal amplification and processing circuit EAP, thus, includes summer S1 and control circuit CNT. The signal of line 110 is received by the capacitive and inductive VAR output computation circuit VARO (FIG. 4), which is part of the bank controller BKC. As shown in FIG. 12 by line 115, the line voltage representative signal $v_L$ is applied with the signal of line 110 to a I/V ratio generating circuit RC. The ratio I/V is the susceptance characterizing the VAR demand. Capacitive and inductive VAR output computation, as well as bank selection, plus thyristor firing, are performed, in response to values of the susceptance, within block BSTF. Thus, block BSTF includes the VARO, the TSC and the TCR functions which are shown in FIG. 13. The output from block BSTF consists of command signals applied to the thyristors within the power system PSY. As a result, a current I is outputted by the system, i.e. a compensating current is drawn from the high voltage bus lines HVB1, HVB2.

Referring to FIG. 13, the VARO function consists in capacitive and inductive VAR output computation, as known in the prior art, to which has been added in the decision making process the dual function according to the present invention. The latter is illustrated by blocks DH1, DH2, DH3 and DH4 responding for the respective capacitors C1, C2, C3, C4 to the susceptance I/V, on lines 111, 111', 111" and 111''' from the I/V ratio circuit RC. In response to the VAR demand expressed in terms of susceptance, on line 113', a look-up table LKT provides on line 91 the firing angles α's needed under TCR operation to accommodate the inductive compensation. TCR operation is effected in accordance with the susceptance, and data stored into a look-up table LKT for providing as a function of I/V the firing angles α's, on line 91, needed under TCR operation to accommodate the inductive current compensation in relation to the capacitor which has been selected. In the latter regard, as earlier mentioned, between two consecutive capacitors of the bank, one may be working (for instance C2) under, or freed from, dual hysteresis (to the left on FIG. 11) or it may be one operating without any dual hysteresis action, because (for instance capacitor C1) the capacitor is active to the left of its operative range. Therefore, between two consecutive capacitors $C_n$ and $C_{n+1}$, there are two possible firing angles $α_n$ and $α_{n+1}$ in relation to the same VAR demand.

Figure 14:
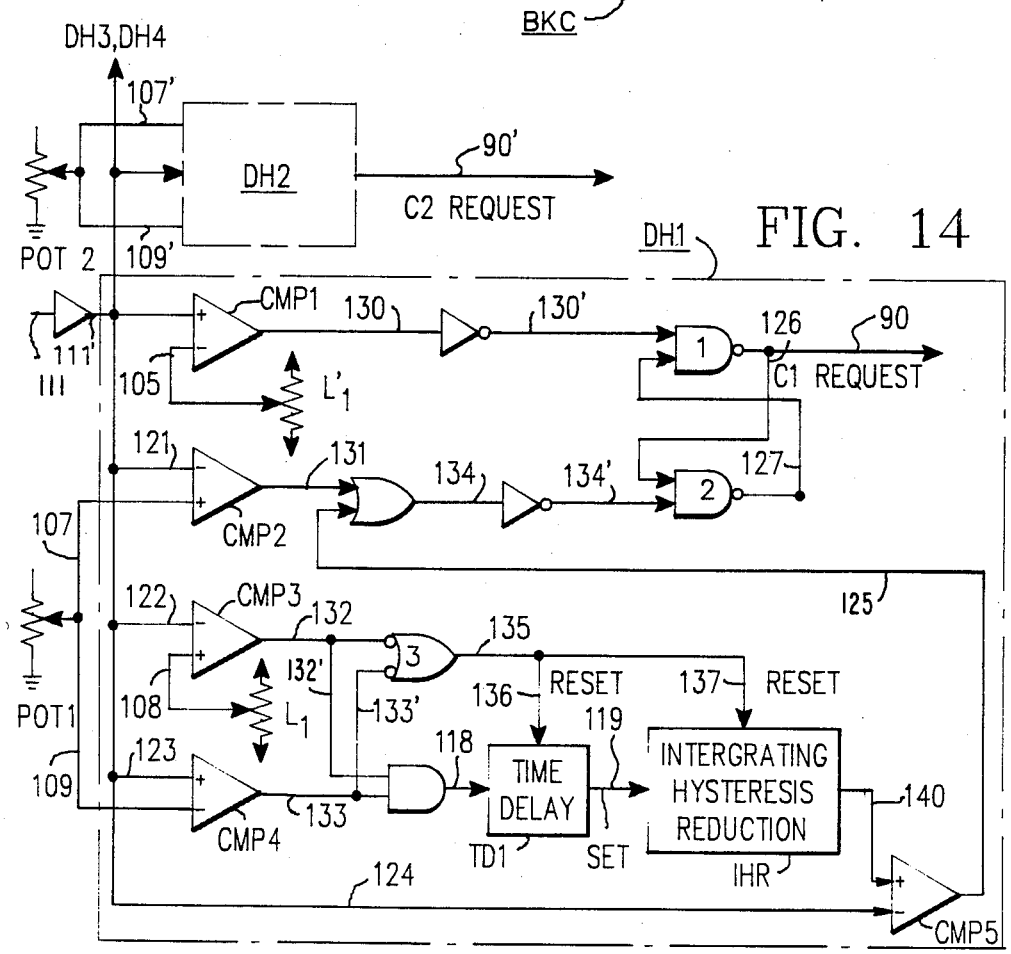
FIG. 14 illustrates circuitry for the implementation of the dual hysteresis according to the present invention.

Referring to FIG. 14, an implementation of the dual-hysteresis function according to the present invention, as performed within block DH of FIG. 13, is now given for illustration in association with the operation of capacitor C1. The susceptance signal of line 111 is passed through an inverting device onto line 111'. A comparator CMP1 receives on its non-inverting input and on line 111' the incoming value of the susceptance. The inverting input of comparator CMP1 receives on line 106 a reference value representing the demand (OF in FIG. 11) for which the capacitive current of the fixed capacitor trajectory (FR) is not matched by any inductive current from the TCR side.

Coming from a zero VAR demand operating point (point 0 in FIG. 11), if the VAR demand comes to exceed the value OF (to the left of limit L1) capacitor C1 is switched ON under TSC operation. Thus, for any operative point to the left of EF in FIG. 11, TCR operation will be working (BE) in conjunction with the fixed capacitor $C_F$ and capacitor C1, so as to remain on the trajectory B'R and match the instant demand of line 111 in FIG. 14. By line 130, inverting device I and line 130', a flip-flop (consisting of two NAND devices #1 and #2 in head-and-tail connection to one another by lines 126 and 127, respectively, is set (a ONE appears on line 130, a ZERO on line 130') so as to output on line 90 (from NAND device #1) a request to have capacitor C1 ON.

Similarly, comparator CMP2 responds to lines 111 and 121, for the operative point on the inverting input thereof, and to a zero value provided on line 107 by a potentiometer PTO1 (typically, for the standby region in the case of capacitor C1 such reference value is zero, but it need not be; another value in the standby region may be chosen instead) for which the operating point is at line L'2, i.e. for zero VAR demand. Therefore, whenever the VAR demand on line 111 reaches and exceeds, to the right, line L'2 of FIG. 11, the flip-flop is, by lines 131, 134 and NAND device #2, reset (a ONE appears on line 131, a ZERO on line 134', a ONE on line 127).

Between these two extreme situations (L1 and L'2), comparators CMP3 and CMP4 provide dual hysteresis operation as follows:

Comparator CMP3 responds to line 111' and line 122 at its inverting input, whereas CMP4 responds to line 111' and line 123 at its non-inverting input. The second input in comparator CMP3 is a reference voltage applied on line 108 representing the fixed-hysteresis (line L'1 in FIG. 11). The second input into comparator CMP4 is taken by line 109 from potentiometer POT1 providing the same reference value as for comparator CMP2, thus a reference value for which the operating point is at line L'2, i.e. for zero VAR demand. The output of CMP3 is on line 132, going via a NAND device #3 onto lines 135, 136, 137. The same output, on line 132 goes via line 132', to an AND device outputting on line 118. The output of comparator CMP4 on line 133 is going by line 133' to NAND device #3 from which are derived output lines 135, 136, 137. Output line 133 also goes into an AND device outputting on line 118.

FIG. 14 shows a time delay TD1 set by line 118 and reset by line 136, and an integrating hysteresis reduction block IHR, set by line 119 at the output of time delay circuit TD1, and reset by line 137. According to the present invention, the dual-hysteresis includes the fixed-hysteresis characterized by the reference signal of line 108 into comparator CMP3, and a variable hysteresis comprised of either the time delay TD1, or the integrating hysteresis reduction block IHR, or both. FIG. 14 shows them both, one behind the other. Once both timed out, the command signal of line 118 is received on line 140 where it is applied to the non-inverting input of a comparator CMP5 otherwise responsive to the signal of line 111 applied, via line 124, onto the inverting input.

When the operating point leaves the standby region to the left (L1 in FIG. 11), capacitor C1 is requested by line 90 to be switched ON. This appears from the fact that, when the VAR demand on line 111 is above the threshold of comparator CMP1, there is a ONE one line 130, thus, a ZERO on line 130' at the input of NAND device #1 of the flip-flop. This causes a ONE to appear on line 90, namely a request for capacitor C1 (n the example of the dual hysteresis function DH1 in FIG. 14). When the operative point reenters the standby region (to the right of line L1 in FIG. 11), the signal of line 130 from comparator CMP1 will apply a ONE on line 130', thereby allowing the flip-flop to be reset by its input 134', when there will be switching OFF of capacitor C1 (in the example).

When the level of line 111 is above the reference value of comparator CMP2, there is a ZERO on line 131 via an OR device, also on line 134, then, a ONE on line 134' (due to the inversion I). A ONE on line 134' and a ONE by line 126 from line 90 makes a ZERO on line 127 at the output of NAND device #2 of the flip-flop. Therefore, the ZERO of line 130' is confirmed by a ZERO on line 127 into NAND device #1.

When the level of line 111 goes below the reference value of comparator CMP1 (the operating point is passing to the left of line L1 of FIG. 11) there will be a ZERO on line 130 and a ONE on line 130'. But, there is still a ZERO on line 127, thus, the request on line 90 remains a ONE for remaining capacitor C1 (in the example) ON. Capcitor C1 will remain ON until the dual hysteresis section (comparators CMP3, CMP4 and CMP5) has allowed the flip-flop to shift to a ZERO at its output on line 90.

When the level of line 111 is above the reference value of comparator CMP1 (line L1 of FIG. 11), comparator CMP5 responds by line 124 so as to output on line 125 a ZERO which is translated by the OR device onto line 134, becoming a ONE on line 134'. Therefore, the dual hysteresis section does not change anything at this time in the operation regarding line 90 and the capacitor C1 request. When the level of line 111 reaches the fixed hysteresis reference value level of line 108, by lines 132, 135, 136 and 137, the time delay TD1 is reset and so is the Integrating Hysteresis Reduction circuit IHR. Still nothing is changed on line 125. Since at that time line 111 has a level above zero VAR demand (under the assumption that the reference value of line 109 from POT1 is ground), line 133 for comparator CMP4 has a one. The effect of the fixed hysteresis ends when the VAR demand has reached and exceeded line L'1 of FIG. 11, that is the reference value of line 108 has been reached by line 111. Then, a ONE appears on lines 132 and 132' at the output of comparator CMP3. Therefore, lines 133 and 132' have both a ONE at the input of the AND device and the latter calls for a ONE on line 118. This means that the time delay TD1 is being triggered. In turn, after the delay TD1, by line 119 the Integrating Hysteresis Reduction circuit IHR is triggered.

Figure 11:
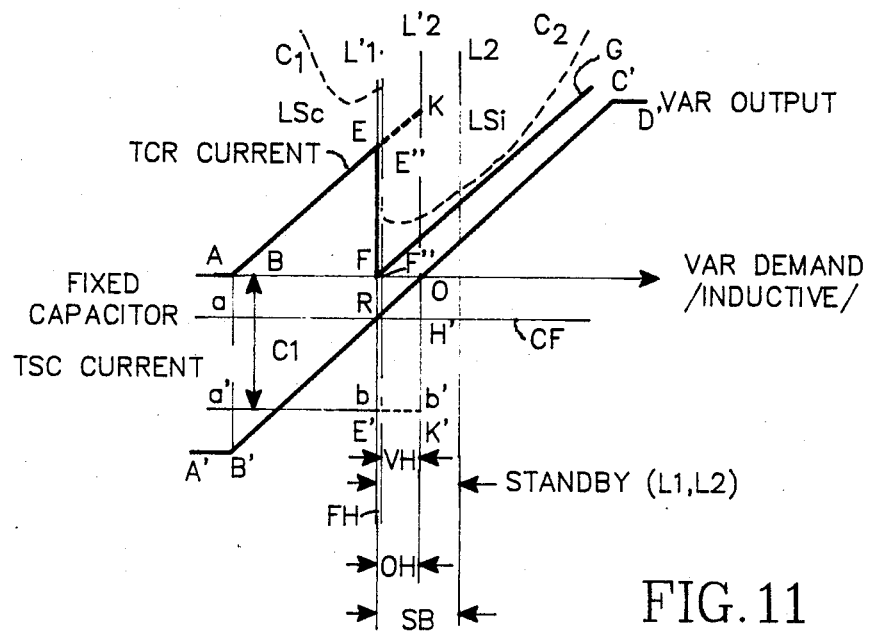
FIG. 11 shows how dual hysteresis according to the present invention eliminates the drawback present in the instance of FIG. 10.

The hysteresis reduction function, as generally known, consists in generating as a function of time an increasing signal, for instance a ramp. Such function appears on line 140. This means that comparator CMP5 will be activated so as to change state on line 125 from a ZERO to a ONE, whenever the demand on lines 111 and 124 intersects the sloping function of line 140, thereby causing the threshold to be exceeded. This will mean a ZERO on line 134' which, with the ONE of lines 90 and 126, will call for a ONE on line 127. Therefore, at this time the ONE's of lines 130 and 127 into the NAND device #1 of the flip-flop will bring a ZERO at its output on line 90, thereby allowing a request for a switch-OFF of capacitor C1, as already indicated when the VAR demand had entered the standby region from the left (FIG. 11).

Figure 15A:
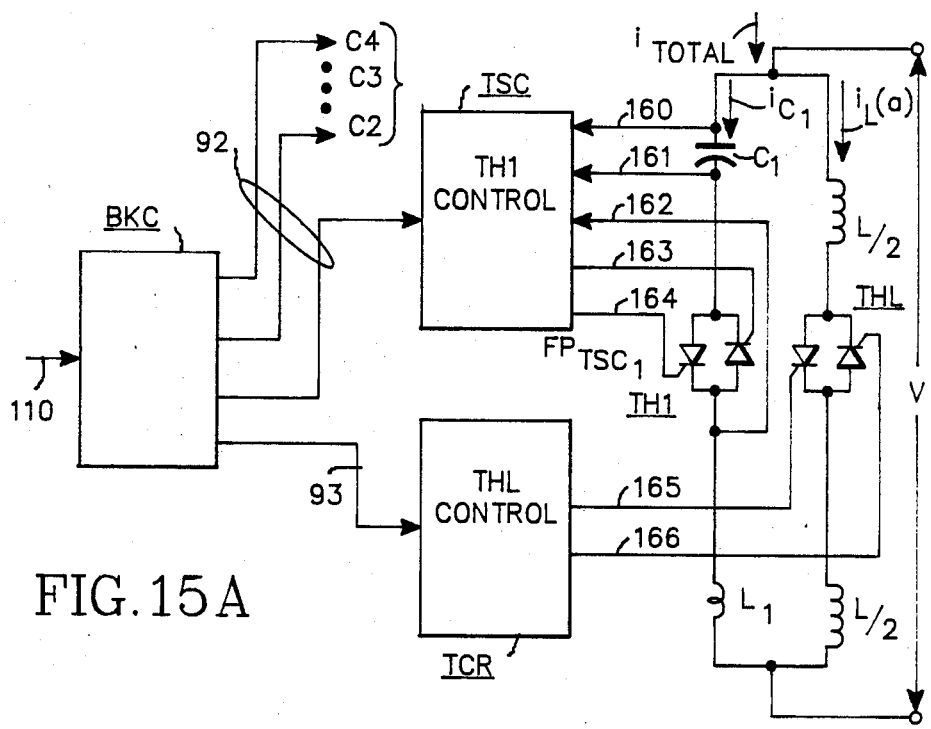
FIG. 15A is a block diagram showing control of the thyristor units in a static VAR compensator where the invention is implemented.
Figure 15B:
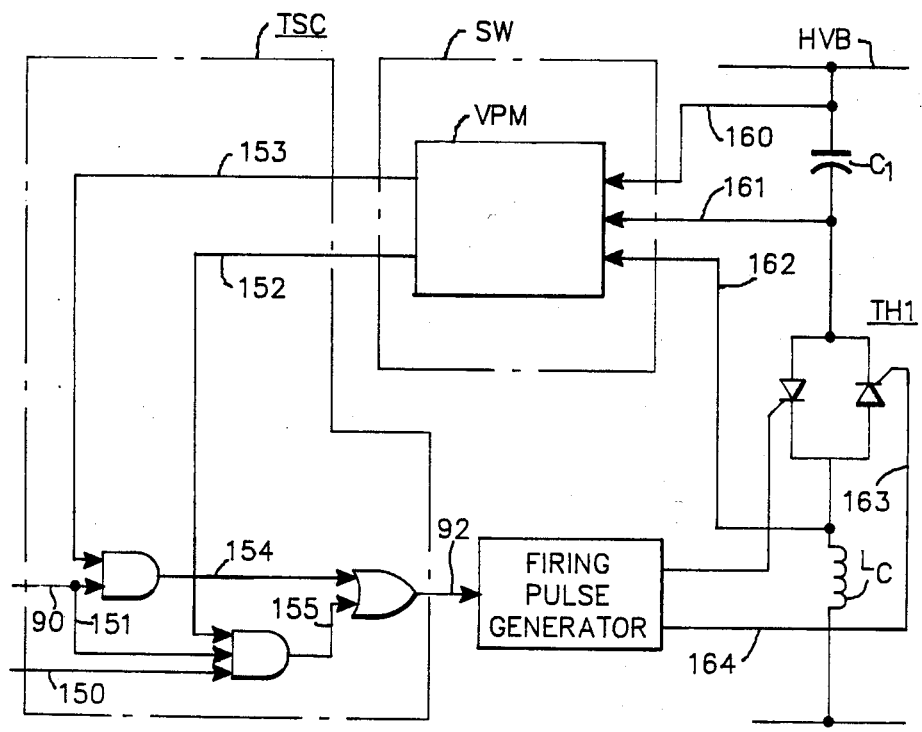
FIG. 15B illustrates control of thyristors associated with the selected capacitor of the bank.

FIG. 15A shows capacitor bank control with block BKC controlling TSC (by lines 92) operation and TCR (by line 93) operation. Thyristor switch voltage sensing and processing is performed in response to the voltage polarity sensed between lines 160 and 161 at the two ends of capacitor C1 (the same for capacitors C2, C3, C4), whereas the voltage polarity is sensed across the TH1 unit by lines 161 and 162. Switching of the thyristors is from lines 163 and 164. In response to line 93 which determines the firing angle α for thyristors THL under TCR operation, lines 165 and 166 control the conduction of THL. TCR operation is shown performed with split reactors L/2 on either side of the THL unit. FIG. 15B is like FIG. 15A, but with more details regarding the TSC block, and with the inclusion of the thyristor voltage and capacitor voltage polarity measurement unit VPM. Firing of the TH1 thyristor unit is upon the request of line 90 conditioned by logical conclusions of the VPM circuit as derived on lines 152 and 153, and in relation to the synchronization pulse received on line 150.

Figure 16:
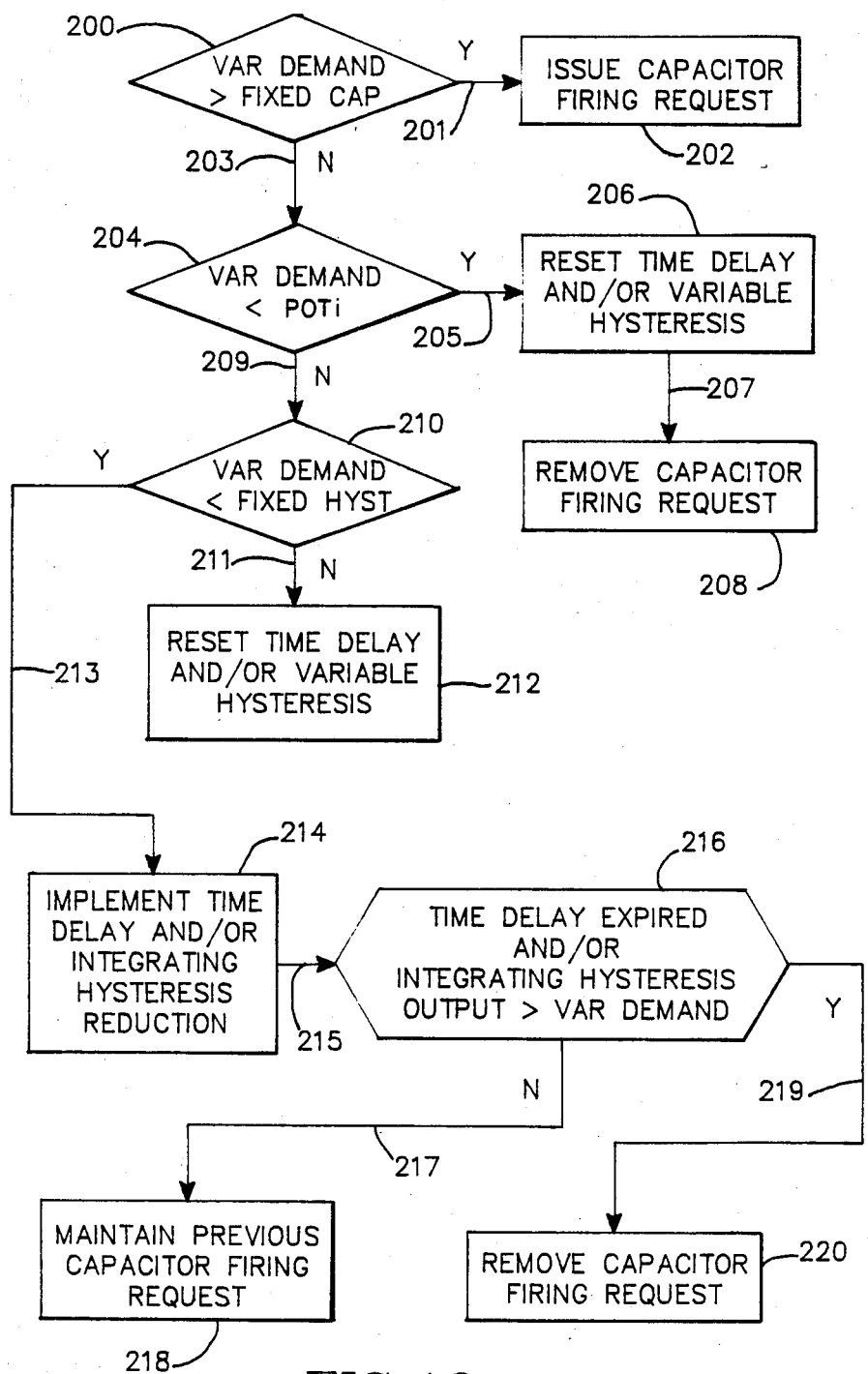
FIG. 16 is a flow chart illustrating the implementation with software of the dual hysteresis function as part of the capacitive and inductive VAR output computation by the bank controller of FIG. 4.

FIG. 16 is a flow chart showing a software implementation of the dual-hysteresis function in the preferred embodiment of the present invention. At 200 the question is whether the VAR demand is larger than the fixed capacitor value. If it is so, by line 210, a capacitor firing request is issued at 202. If the answer to the question of block 200 if NO, by line 203 the system goes to the question (at 204) whether the VAR demand is smaller than PTOi (where PTOi is the reference value associated with a potentiometer like PTO1–PTO4 of rank i). If the answer is YES, by 205 the system orders at 206 that the time delay TD1 (if there is one) and the variable hysteresis (if there is a function like block IHR of FIG. 14 provided in addition to the time delay), or either one (if there is only one of the two), be reset. This is done at 208. If the answer to block 204 is NO, the system by 209 raises the question "Is the VAR demand smaller than the fixed hysteresis ?". This question is at 210. If the answer is NO, by 211 and at block 212, like at 206, there is a reset of the variable hysteresis function, or functions. If the answer at 210 is YES, by 213 at block 214 the variable hysteresis is implemented. Then, by line 215 come questions raised at 216; "Has the time delay expired?" (if there is a time delay provided); "Is the output of the integrating hysteresis larger than the VAR demand?" (if there is such a function provided). Upon a YES, by line 219 the system goes to 220 where the capacitor firing request is removed. If there is a NO, by line 217 the system goes to 218 where the command is to maintain the previous capacitor firing request.

We claim:

1. In a static VAR compensator for high voltage AC transmission lines, including in parallel to two of said transmission lines:

(a) a plurality of switchable capacitors and a plurality of capacitor thyristor units for connecting a corresponding switchable capacitor of said plurality for each polarity across said two transmission lines;

(b) a fixed capacitor connected across said two transmission lines; and (c) reactor means and a reactor thyristor unit for connecting said reactor means across said two transmission lines for each polarity;

said switchable capacitors, fixed capacitor and reactor means concurring in providing a compensating reactive current path between said two transmission lines;

means being provided for deriving in relation to said transmission lines a VAR demand representative signal; and means responsive to said VAR demand signal for controlling selectively said capacitor thyristor units and said reactor thyristor unit to adjust the compensating current in said path in relation to said error signal;

the combination of:

fixed hysteresis means and variable hysteresis means within said controlling means;

with said fixed hysteresis and variable hysteresis means being activated when said VAR demand error signal calls for switching one of said switchable capacitors OFF to provide a reduced capacitive current in said reactive current path.

2. The static VAR compensator of claim 1, with said VAR demand signal having one polarity for inductive current demand;

said capacitor thyristor units being operated on by said controlling means in a TSC mode of operation to generate capacitive current with said switchable capacitors;

said reactor thyristor unit being operated on by said controlling means in a TCR mode of operation to generate inductive current with said reactor means;

said controlling means being operative in the TSC and TCR modes concurrently when said VAR demand signal is of said one polarity;

a minimum VAR demand of said one polarity being provided for switching ON a first one of said plurality of switchable capacitors, thereby to provide a capacitive standby range from zero VAR demand;

said fixed and variable hysteresis means being effective when entering said capacitive standby range from a higher capacitive current demand, thereby to minimize standby losses.

3. The static VAR compensator of claim 2 with said fixed-hysteresis means being exercised to prevent switching-OFF of a switchable capacitor having a request to be switched-OFF until said VAR demand exceeds a theshold value by a predetermined fixed VAR amount, with said variable-hysteresis means being triggered when the operation of said fixed-hysteresis has expired, and being exercised to prevent switching-OFF of said switchable capacitor having a request to be switched-OFF, until said VAR demand exceeds said threshold value by a second VAR amount larger than said fixed VAR amount, means being provided to cancel-out said second VAR amount as a function of time.

4. The static VAR compensator of claim 3 with said cancel-out means comprising means for establishing a time delay, said variable hysteresis means being disabled at the expiration of said time delay.

5. The static VAR compensator of claim 3 with said cancel-out means including an integrator for decreasing said second VAR amount as a function of time down to said fixed VAR amount.

6. The static VAR compensator of claim 5 with means for establishing a time delay being associated with said integrator to delay operation of said integrator until said time delay has expired.

7. The static VAR compensator of claim 1 with said controlling means providing a request for switching one of said switchable capacitors in response to said VAR demand representative signal;

said request being to switch-ON one switchable capacitor when the VAR demand is increasing beyond a predetermined upward threshold, and to switch-OFF such switchable capacitor when the VAR demand is decreasing beyond a predetermined downward threshold;

said fixed-hysteresis and variable-hysteresis means being activated when said downward threshold is exceeded.

8. The static VAR compensator of claim 7 with said switchable capacitors forming a bank of capacitors in succession ranging from minimum capacitive current compensation to maximum capacitive current compensation, the first switchable capacitor in said succession having an upward threshold corresponding to the upper limit of a capacitive standby range having zero VAR demand as the lower limit thereof;

the upward and downward thresholds of said first capacitor being a common associated with the same VAR demand;

said fixed-hysteresis and variable-hysteresis means being actuated by and operative concurrently from said common threshold, thereby to minimize capacitive standby losses.

9. The static VAR compensator of claim 8 with such said fixed-hysteresis and variable-hysteresis means being provided for operation with each switchable capacitor of said succession;

with the upward and the downward thresholds of each such capacitor being a common threshold corresponding to the same VAR demand.

said fixed-hysteresis and variable-hysteresis means being actuated upon a decreasing VAR demand beyond such common threshold, a corresponding first and second VAR amount being counted from such corresponding common threshold.

* * * * *